United States Patent
Hutson et al.

(10) Patent No.: US 7,269,998 B2
(45) Date of Patent: Sep. 18, 2007

(54) WIND GAUGES AND WIND GAUGE KITS

(75) Inventors: John N. Hutson, Raleigh, NC (US); Joshua Montgomery, Lawrence, KS (US); William A. Anemaat, Lawrence, KS (US)

(73) Assignee: John N. Hutson, Jr., Raleigh, NC (US)

( * ) Notice: Subject to any disclaimer, the term of this patent is extended or adjusted under 35 U.S.C. 154(b) by 0 days.

(21) Appl. No.: 11/200,604

(22) Filed: Aug. 10, 2005

(65) Prior Publication Data
US 2007/0034001 A1   Feb. 15, 2007

(51) Int. Cl.
*G01W 1/00* (2006.01)
(52) U.S. Cl. .................. 73/170.01; 73/170.02
(58) Field of Classification Search ............. 73/170.01, 73/170.05, 170.02
See application file for complete search history.

(56) References Cited

U.S. PATENT DOCUMENTS

| | | | |
|---|---|---|---|
| 910,035 A | 1/1909 | Winder | |
| 1,236,296 A | 8/1917 | Hanks | |
| 1,708,036 A | 4/1929 | Stenbol | |
| 2,061,189 A | 11/1936 | Dungan | |
| 2,467,374 A | 4/1949 | Findlater | |
| 2,491,176 A | 12/1949 | Hammond | |
| 2,749,751 A | 6/1956 | Hastings | |
| 2,845,797 A | 8/1958 | Hiscock | |
| 2,889,707 A | 6/1959 | Snider | |
| 2,935,872 A | 5/1960 | Misner | |
| 3,089,335 A | 5/1963 | Ebert | |
| 3,899,929 A | 8/1975 | Slimp, Jr. | |
| 4,295,367 A | 10/1981 | Leslie | |
| 4,389,887 A | 6/1983 | Howlett | |
| 4,488,431 A * | 12/1984 | Miga ..................... 73/170.08 |
| 4,671,108 A | 6/1987 | Vonnegut | |
| 5,117,690 A | 6/1992 | Baer | |
| 5,127,358 A | 7/1992 | Galloway et al. | |
| 5,265,469 A | 11/1993 | Hall | |
| 5,319,967 A | 6/1994 | Rickards, Jr. | |
| 5,343,743 A | 9/1994 | Chapman | |
| 5,639,963 A | 6/1997 | Sustare, Jr. | |
| 5,811,673 A | 9/1998 | Kwok et al. | |

FOREIGN PATENT DOCUMENTS

FR    2624616 A1    12/1987

OTHER PUBLICATIONS

International Search Report and the Written Opinion of the International Searching Authority for PCT Application No. PCT/US06/30507 dated Nov. 2, 2006.

* cited by examiner

*Primary Examiner*—Andre Allen
(74) *Attorney, Agent, or Firm*—Myers Bigel Sibley & Sajovec, PA

(57) ABSTRACT

A wind gauge includes a wind vane. The wind vane includes at least one wing. The wind vane is adapted to assume a prescribed level position responsive to a prescribed corresponding wind speed incident on the wind vane.

30 Claims, 11 Drawing Sheets

WIND GAUGES AND WIND GAUGE KITS

FIELD OF THE INVENTION

The present invention relates to devices for measuring one or more characteristics of wind and, more particularly, to wind speed gauges.

BACKGROUND OF THE INVENTION

It is often necessary or desirable to determine the direction and speed of a blowing wind, and wind measuring devices of various designs and functionality have been developed for this purpose. In some cases, a wind gauge should or must-be portable. For example, pilots and hunters may require a portable wind gauge. It may also be desirable to provide a wind gauge that is simple and convenient to use.

SUMMARY OF THE INVENTION

According to embodiments of the present invention, a wind gauge includes a wind vane. The wind vane includes at least one wing. The wind vane is adapted to assume a prescribed level position responsive to a prescribed corresponding wind speed incident on the wind vane.

The wind gauge may include a weight system operable to selectively adjust a center of gravity of the wind vane.

The wind gauge may include a weight system operable to adjust the amount of the weight of the wind vane, the weight system including at least one removable and replaceable weight member.

The wind gauge may include a lift control system operable to selectively adjust an amount of lift force provided by the at least one wing responsive to a wind having a given speed.

According to some embodiments, the wind vane includes a body and the at least one wing is selectively positionable on the body at first and second alternative locations. When the at least one wing is positioned on the body at the first location, the wind vane will assume the prescribed level position responsive to a first prescribed wind speed incident on the wind vane. When the at least one wing is positioned on the body at the second location, the wind vane will assume the prescribed level position responsive to a second prescribed wind speed incident on the wind vane.

The at one least wing can have a teardrop-shaped airfoil section. The wind gauge may be adapted to be handheld in use. The wind gauge may include a support member coupled to the wind vane so as to allow free movement of the wind vane responsive to an incident wind to be measured. According to some embodiments, the wind gauge includes a level orientation indicator adapted to indicate when the wind vane assumes the prescribed level position.

According to further embodiments of the present invention, a wind gauge kit includes a plurality of wind gauges. Each of the wind gauges includes a wind vane including at least one wing. The wind vane is adapted to assume a prescribed level position responsive to a prescribed corresponding wind speed incident on the wind vane. The respective prescribed corresponding wind speed is different for each of the wind gauges. According to some embodiments, the wind gauge kit includes a connecting member, the wind gauges each being mounted on the connecting member. The connecting member may be adapted to allow the wind gauges to be simultaneously deployed such that each of the wind gauges independently and simultaneously responds to an incident wind.

According to further embodiments of the present invention, a wind gauge includes a wind vane and a level orientation indicator. The level orientation indicator is adapted to indicate when the wind vane assumes a prescribed level position. The level orientation indicator may include a bubble level device.

According to further embodiments of the present invention, a method for measuring a speed of a wind includes: placing a wind vane of a wind gauge in the wind, the wind vane including at least one wing; and determining whether the wind vane assumes a prescribed level position responsive to the wind incident on the wind vane.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1A:
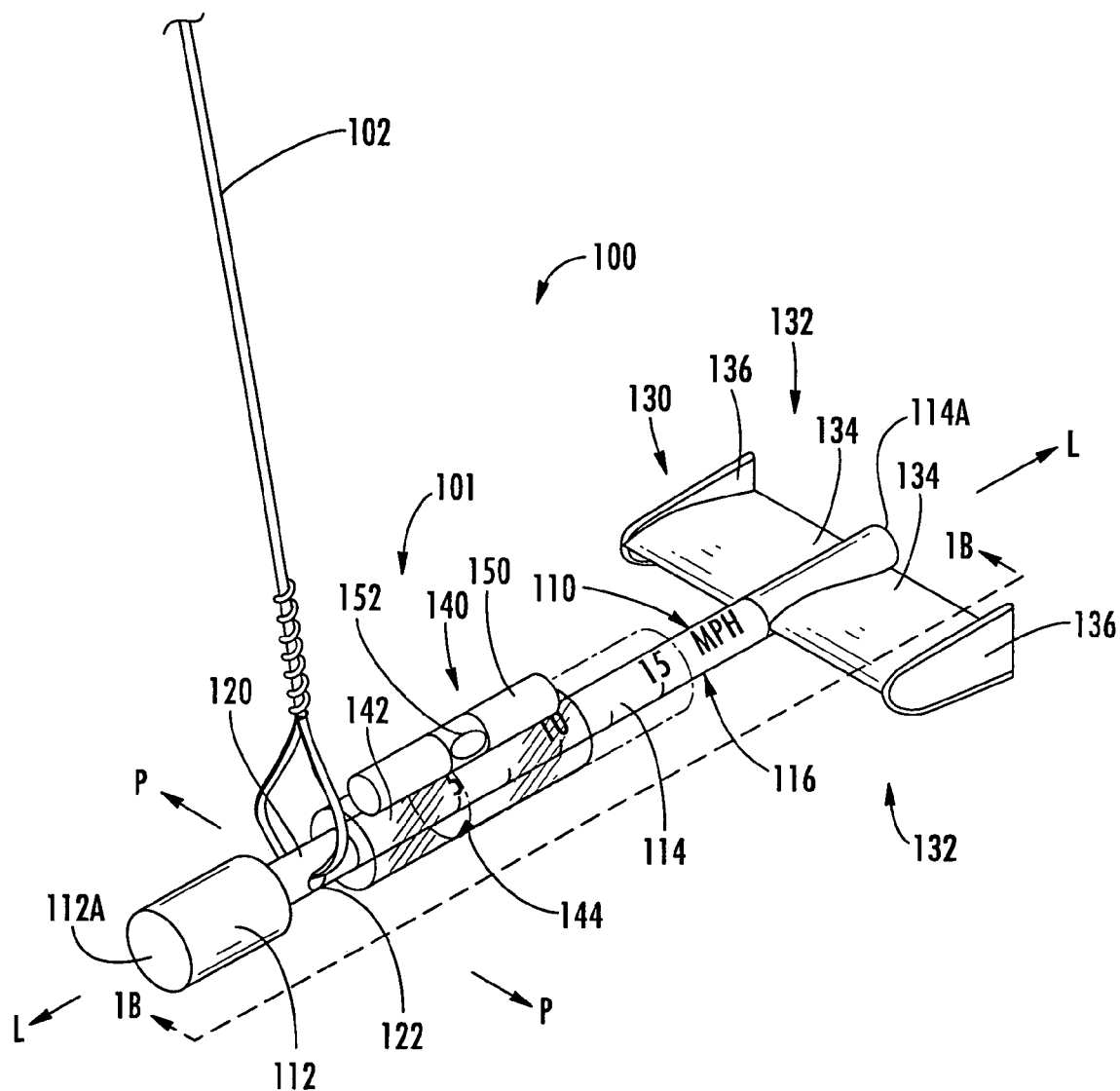
FIG. 1A is a perspective view of a wind gauge according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
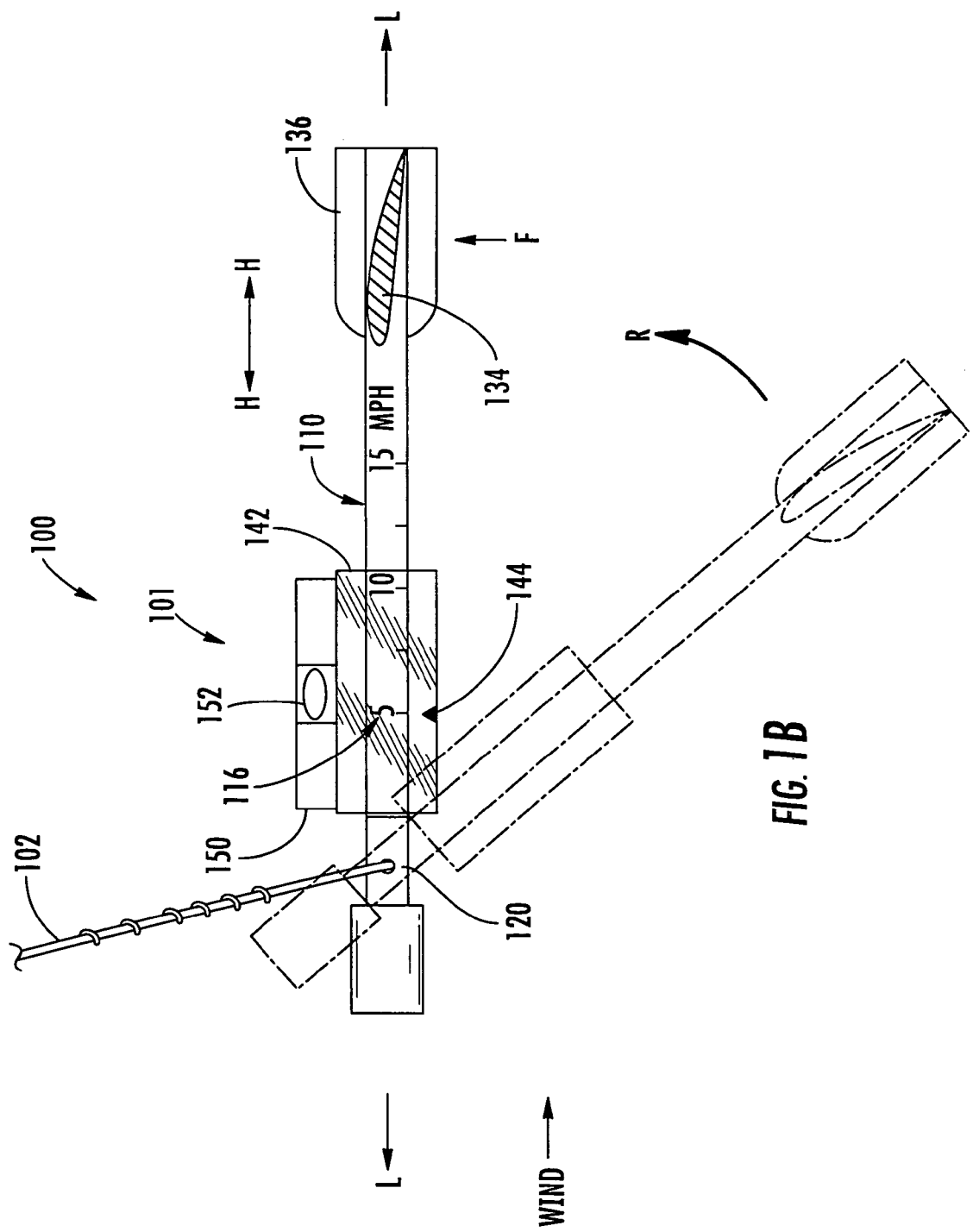
FIG. 1B is a side, cross-sectional view of the wind gauge of FIG. 1A taken along the line 1B-1B of FIG. 1A.

With reference to FIGS. 1A and 1B, a wind gauge 100 according to embodiments of the present invention is shown therein. The wind gauge 100 includes a wind vane 101 and a cord 102 coupled to the wind vane 101. The wind vane 101 includes a wind gauge body 110, a wing assembly 130 and a weight system 140. As discussed in more detail below, the wind gauge 100 may be used to selectively determine a wind speed within a given range of wind speeds.

The body 110 has a front end 112A and a rear end 114A and defines a longitudinal axis L-L. The cord 102 extends through a hole 122 provided in the body 110 at a pivot location 120 intermediate the ends 112A, 114A. A front section 112 of the body 110 extends from the pivot location 120 to the front end 112A and a rear section 114 of the body 110 extends from the pivot location 120 to the rear end 114A. Indicia 116 corresponding to measured wind speeds (e.g., "5", "10", "15 mph") is provided on the body 110 along its length.

The body 110 may be formed of any suitable rigid or semi-rigid material. According to some embodiments, the body 110 is formed of a polymeric material such as ABS, nylon, polypropylene or polyethylene. According to some embodiments, the body 110 has a length in the range of from about 1 to 5 inches.

The wing assembly 130 includes a pair of wing subassemblies 132 mounted on opposed sides of the body 110. The wing subassemblies 132 are mirror images of one another about the axis L-L. Each wing subassembly 132 includes a horizontally extending lift wing 134 and a vertically extending stabilizer wing or fin 136.

According to some embodiments and as illustrated, the lift wings 134 are adapted to provide a vertical lift force when a generally horizontal wind is passed thereabout in a front to rear direction. According to some embodiments, the airfoil section of each wing 134 is teardrop-shaped as shown in FIG. 1B. The airfoil sections of the wings may be curved. According to some embodiments, the angle of attack of the lift wings 132, when the body 110 is parallel to the incident wind, is in the range of from about 0 to 7 degrees. According to some embodiments, the lift wings 134 provide lift predominantly by angle of attack and, according to some embodiments, substantially entirely by angle of attack. According to other embodiments, the lift wings 134 provide lift predominantly by virtue of their airfoil section geometry (e.g., causing greater fluid velocity at top surface than at bottom surface and a resultant pressure differential) and, according to some embodiments, substantially entirely as a result of airfoil section geometry. According to other embodiments, the wings are not lift wings.

The wing assembly 130 may be formed of any suitable material. Suitable materials may include those listed above with regard to the body 110. According to some embodiments, the wing assembly 130 is integrally and unitarily molded with the body 110.

The weight system 140 can be used to selectively adjust the center of gravity of the wind vane 101 along the axis L-L. The weight system 140 includes an adjustable balance weight member 142. The weight member 142 is slidably mounted on the body 110 for movement along the axis L-L in either of a forward direction and a rearward direction. The weight member 142 may be formed of any suitable material. According to some embodiments, the weight member 142 is formed of brass. According to some embodiments and as illustrated, the weight member 142 may be formed of a translucent material and have an indicator mark or other indicia 144 to facilitate selective positioning of the weight member 142 relative to the body 110. A frictional engagement, protrusion and detent, clamp and/or other mechanism is provided to secure the weight member 142 in a set position along the body 110. It will be appreciated that other materials, configurations and mechanisms may be employed to allow for selective movement, setting and securement of the weight member 142 and/or for indicating the position of the weight member 142 relative to the body 110. According to some embodiments, the mass of the weight member 142 is between about 0.25 and 1.5 oz.

A level indicator device such as a bubble level 150 is mounted on the weight member 142. The bubble level 150 is configured to indicate when the bubble level 150 (and, thus, the wind vane 101) is horizontally oriented. For example, the bubble level 150 may include a translucent tube containing a liquid and a bubble 152. The bubble level 150 indicates a level position when the bubble 152 is centered relative to indicia on the tube or elsewhere.

Generally, and as will be appreciated from the following discussion, the wind gauge 100 is tuned or configured such that the balance point or center of gravity of the wind vane 101 along the axis L-L can be adjusted or relocated by selectively positioning the weight member 142 (which determines the moment arm associated with the weight member 142). The center of gravity will be located such that, in the absence of lift force on the wings 134, the wind vane 101 will assume a non-level position. The incident wind generates a vertical lift force F on the wings 134 that is proportional to the wind speed (and, more particularly to the square of the wind speed). The lift force F will counteract the weight imbalance of the wind vane 101. The wind vane 101 will assume a level position when the lift force F on the wings 134 fully compensates for the weight imbalance (i.e., when a moment and force equilibrium is established between the gravitational forces, the lift forces, and force on the cord 102). The wind speed required to generate the fully compensating lift force is the prescribed wind speed corresponding to the setting of the weight member 142. It will be appreciated that the farther away the weight member 142 is from the pivot location 120, the greater the lift force that will be required to overcome the load of the weight member 142.

The wind gauge 100 may be used as follows to measure the speed of an incident wind. The user may first slide the adjustable weight member 142 to the setting corresponding to an estimated wind speed. As discussed above, the weight member 142 can be set to configure the wind gauge to correspond to different prescribed wind speeds. For example, the user can slide the weight member 142 from a first location along the body 110 as shown in solid lines to a second location as shown in dashed lines in FIG. 1A, or vice-versa. The user may deploy the wind gauge 100 by grasping or hanging the wind gauge 100 by the cord 102 so that the wind vane 101 is loosely suspended from the cord 102.

Responsive to the wind, the wind vane 101 may rotate as needed about a vertical axis to properly orient itself such that the axis L-L is substantially parallel to the horizontal direction of the wind with the front end 112A headed into the wind, as shown in FIG. 1B. Also, responsive to the wind, the wind vane 101 will automatically rotate in a direction R (FIG. 1B) about a generally horizontal rotation axis P-P (FIG. 1A) that extends transversely to the longitudinal axis L-L. The axis P-P may shift vertically and/or aft as the cord 102 moves.

If there is no wind or the actual wind speed is less than the wind speed for which the weight member 142 is set, the weight imbalance of the wind gauge 100 will cause the wind vane 101 to remain oriented at some tilt angle relative to horizontal H-H as shown in dashed lines in FIG. 1B, for example. In this case, while there may be some vertical lift force on the wings 134, it is not sufficient to balance the wind vane 101 against the gravitational imbalance caused by the longitudinal offset of the center of gravity from the pivot point.

If the actual wind speed is substantially the same as the prescribed wind speed for the setting of the weight member 142, the lift force on the wings 134 will cause the wind vane 101 to rotate in the direction R (FIG. 1B) so that the wind vane 101 assumes a level position as shown in FIG. 1B in solid lines. According to some embodiments, when the wind vane 101 is in the level position, the body 110 is substantially horizontal. The user may ascertain or confirm that the wind vane 101 is in its level position by reference to the bubble level 150, which will indicate a level orientation.

If the wind speed is not sufficient to rotate the wind vane 101 to the level position with the current setting of the weight member 142, the user can slide the weight member 142 to a lower wind speed setting and redeploy the wind gauge 100 until the appropriate wind speed setting is selected.

If the wind speed is greater than the wind speed corresponding to the current setting of the weight member 142, then the wind vane 101 will over-rotate in the direction R to a non-level position wherein the end 114A is raised above the end 112A. The user can similarly select a reduced wind speed setting for the weight member 142 and redeploy the wind gauge 100.

Thus, as described above, the wind vane 101, when set for a prescribed wind speed, will attain a prescribed level position in response to a given wind having the prescribed wind speed, and will retain that level position for so long as the wind speed remains. If the actual wind speed is less than the prescribed wind speed, the wind vane 101 will not assume the level position (i.e., the wind vane 101 will remain in or assume a non-level position). Thus, the wind gauge 100 provides a convenient device that is relatively simple to use and read inasmuch as it requires only a binary analysis (i.e., level versus non-level). The wind gauge 100 nonetheless also provides for measurement of a range of wind speeds using the movable weight member 142.

Figure 2A:
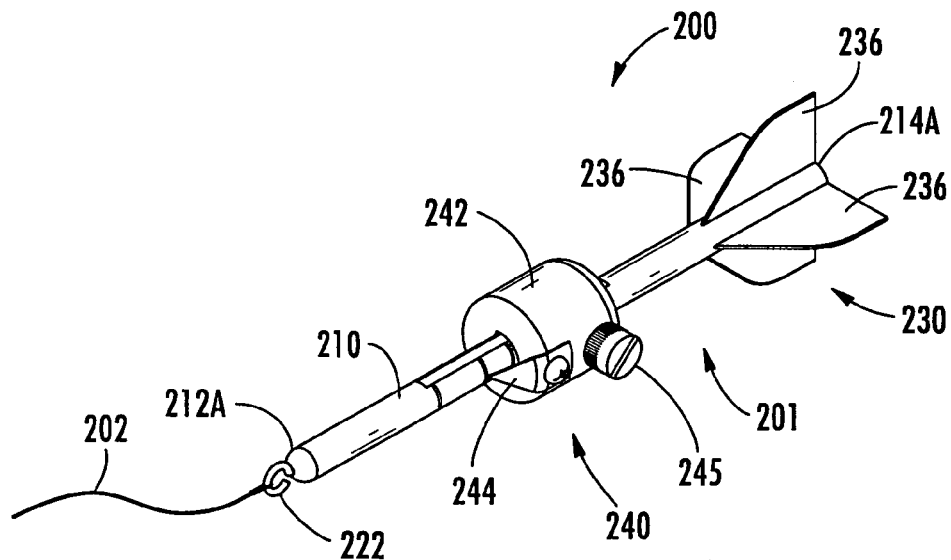
FIG. 2A is a perspective view of a wind gauge according to further embodiments of the present invention.
Figure 2B:
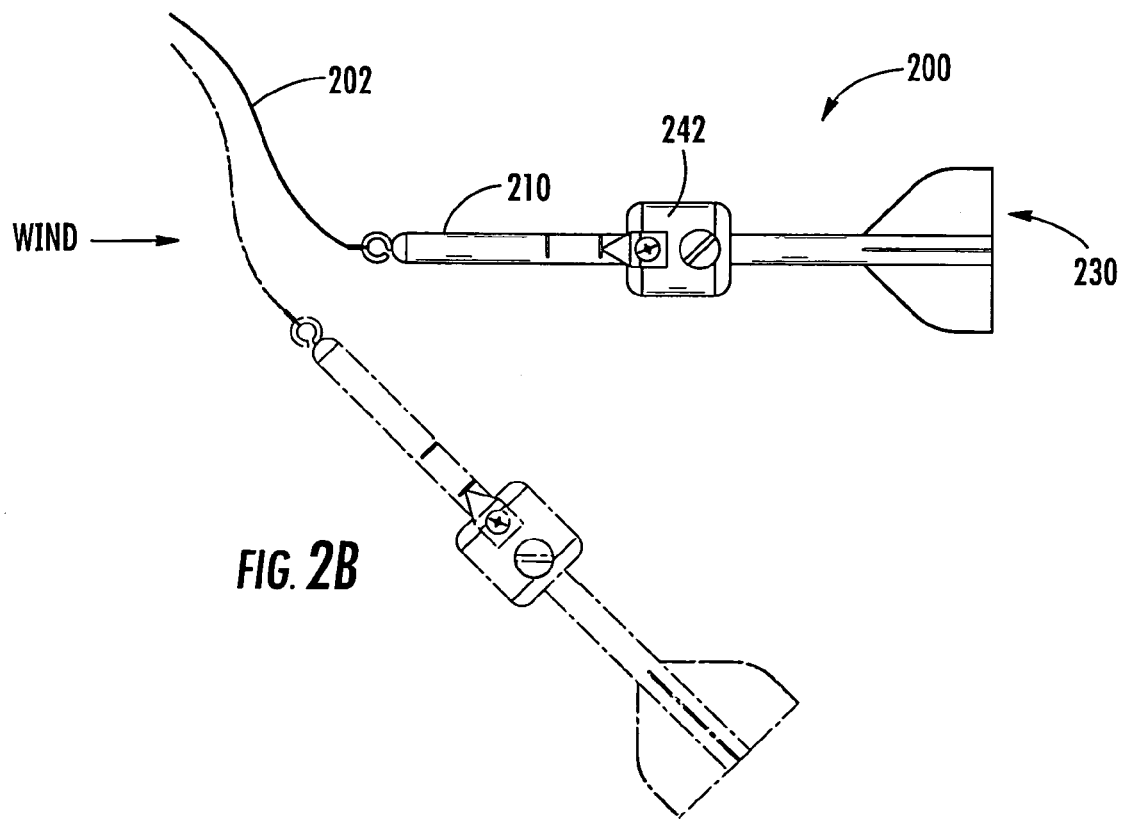
FIG. 2B is a side view of the wind gauge of FIG. 2A.

With reference to FIGS. 2A and 2B, a wind gauge 200 according to further embodiments of the present invention is shown therein. The wind gauge 200 includes a wind vane 201 and a cord 202. The wind vane 201 includes a body 210, a wing assembly 230 and a weight system 240. The cord 202 is coupled to the body 210 by an eyelet 222 at the front end 212A of the body 210. The wing assembly 230 is mounted on the body 210 at the rear end 214A. The weight system 240 is mounted on the body 210 between a pivot location 222 and the wing assembly 230. The wing assembly 230 includes wings 236, some of which may be teardrop-shaped in airfoil section or, as shown, may each be flat panels. The weight system 240 includes a weight member 242 that is slidable along the length of the body 210. The weight system 240 has an indicator 244 and a setscrew 245 to secure the weight member 242 in each selected position.

The wind gauge 200 may be used in the same manner as the wind gauge 100. As shown in FIG. 2B, when the wind gauge 200 is subjected to a wind speed corresponding to the prescribed wind speed for the setting of the weight member 242, the wind vane 201 will move from a non-level position (dashed lines in FIG. 2B) to a level position (solid lines in FIG. 2B). Typically, a wind speed greater than the prescribed wind speed will not cause the wind vane 201 to attain a non-level position. Accordingly, the user may continue to position the weight member 242 at lower wind speed settings to determine the lowest such setting for which the wind gauge 200 will assume the level position.

Figure 3A:
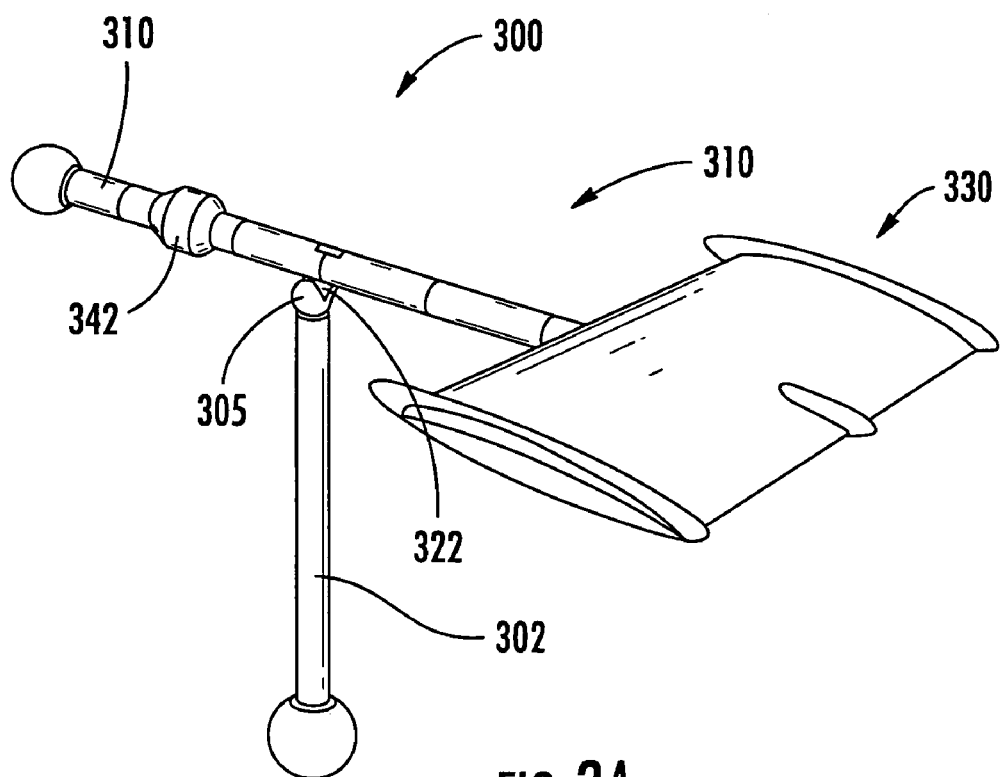
FIG. 3A is a perspective view of a wind gauge according to further embodiments of the present invention.
Figure 3B:
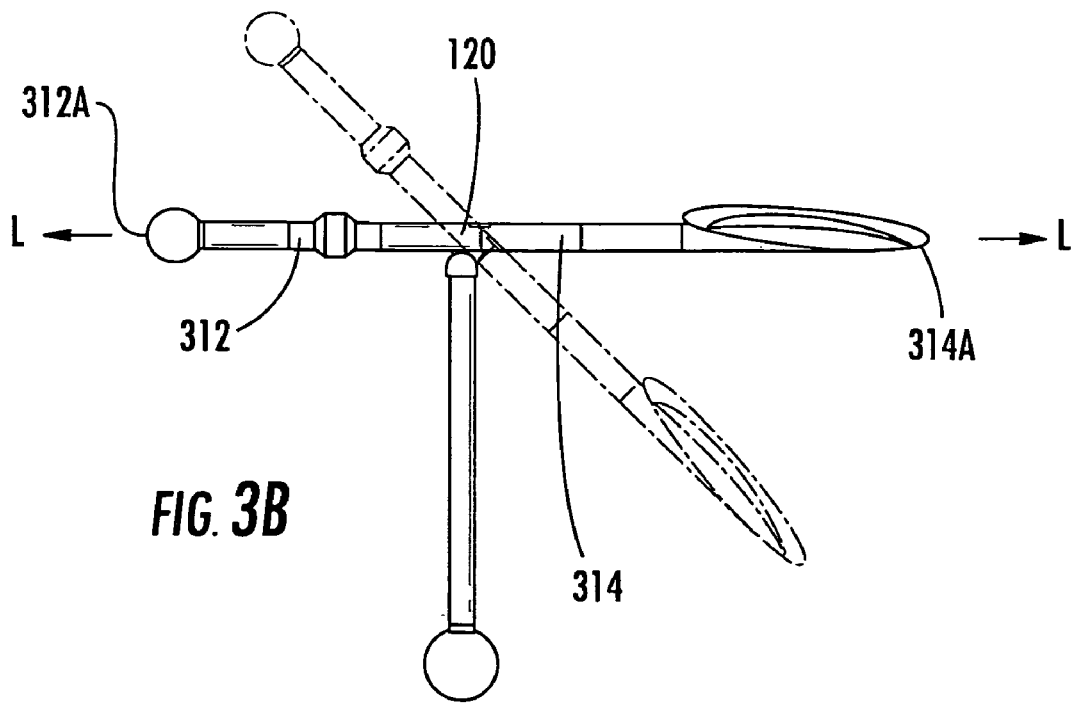
FIG. 3B is a side view of the wind gauge of FIG. 3A.

With reference to FIGS. 3A and 3B, a wind gauge 300 according to further embodiments of the present invention is shown therein. The wind gauge 300 includes a wind vane 301 and a handle 303. The wind vane 301 includes a body 310 having a front end 312A and a rear end 314A. The handle 303 has a hinge portion 305 that is pivotally coupled to a hinge portion or tab 322 of the body 310 to form a hinge. The hinge permits the wind vane 301 to pivot relative to the handle 303 about a horizontal axis that is transverse (as shown, perpendicular) to the axis L-L of the body 310. The pivot location 320 divides the body 310 into a front section 312 between the front end 312A and the pivot location 320 and a rear section 314 between the rear end 314A and the pivot location 320 (FIG. 3B).

A wing assembly 330 is mounted on the rear section 314. The wing assembly 330 may include wings having a curved teardrop airfoil section as illustrated.

A weight system 340 is provided for selectively adjusting the center of gravity of the wind vane 301. The weight system 340 includes an adjustable weight member 342 slidably mounted on the front section 312. The weight member 342 may be constructed and movable/settable in the same manner as discussed above with regard to the weight member 142.

The wind gauge 300 may be used in the same manner as the wind gauge 100, except that the user grasps the handle 303 and orients the wind vane 301 such that it is facing directly into the wind. If a prescribed wind speed is present, the wind vane 301 will assume a prescribed level position as shown in solid lines in FIG. 3B. If the wind speed is less than the set prescribed wind speed, the wind vane 301 will remain in or attain only a non-level or tilted position as shown in dashed lines in FIG. 3B. It will be appreciated that the weight 342 serves as a counterweight and the closer the weight member 342 is to the pivot location 320, the greater the lift force from the wind that will be required to place the wind vane 301 in its level position.

Figure 4A:
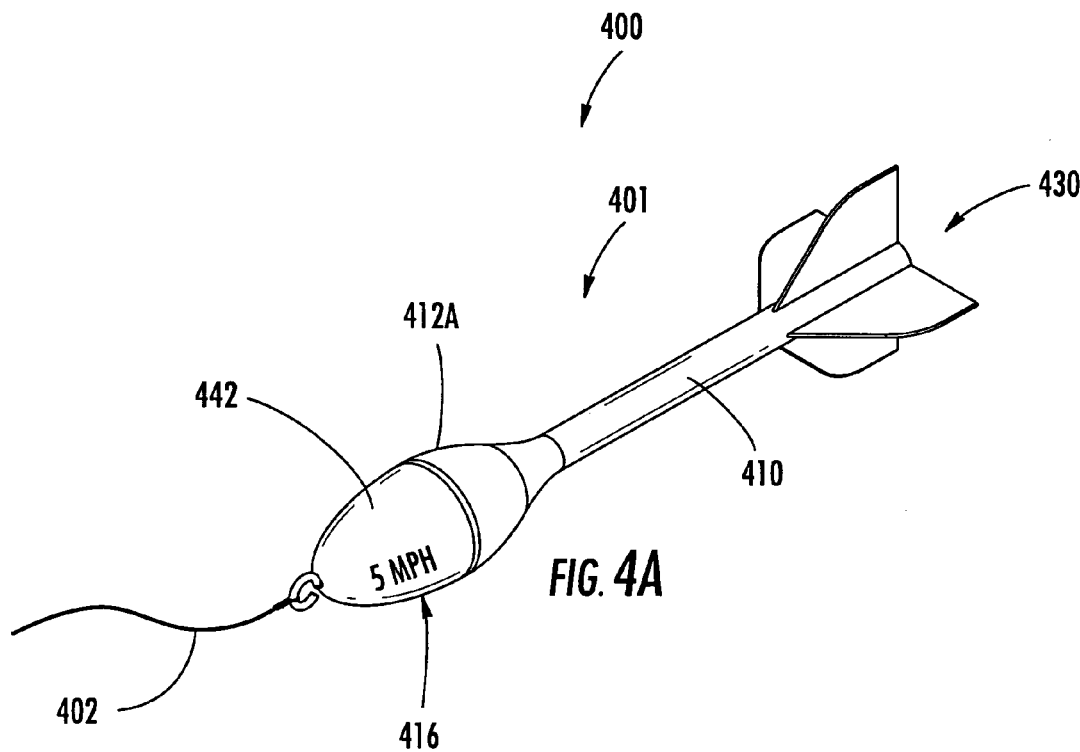
FIG. 4A is a perspective view of a wind gauge assembly according to further embodiments of the present invention, wherein the wind gauge includes a first weight member.
Figure 4B:
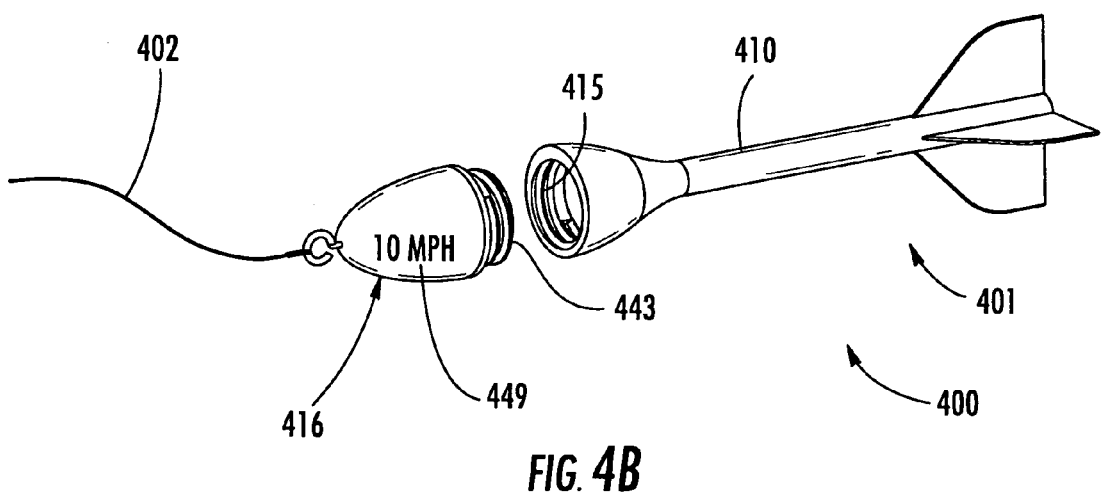
FIG. 4B is a perspective view of the wind gauge of FIG. 4A, wherein the first weight member is replaced with a second weight member.

With reference to FIGS. 4A and 4B, a wind gauge 400 according to further embodiments of the present invention is shown therein. The wind gauge 400 includes a body 410 and a wing assembly 430 mounted on a rear end 414A of the body 410. A threaded bore 415 is formed in a front end 412A of the body 410. The wind gauge 400 further includes a weight system including a first weight member 442 and a second weight member 449. The weight members 442, 449 have different masses. Each weight member 442, 449 is coupled to a cord 402 by an eyelet or the like. Also, each weight member 442, 449 has a threaded base 443 configured to mate with the threaded bore 415 so that the weight members can be interchangeably mounted on the body 410. Each weight member 442, 449 corresponds to a different respective prescribed wind speed and has corresponding indicia 416 thereon. The weight system 440 may be used to adjust the weight of the wind vane 401 and may also be used to adjust the center of gravity of the wind vane 401.

The wind gauge 400 may be used in the same manner as the wind gauge 200, except that instead of setting the prescribed wind speed by positioning the adjustable weight member 142 along the length of the body, the user removes and replaces the weight members 442, 449 as appropriate. For example, to measure for a first prescribed wind speed the user may install the weight member 442. To measure for a second prescribed wind speed, the user removes the weight member 442 and installs the weight member 449 in its place.

Figure 5A:
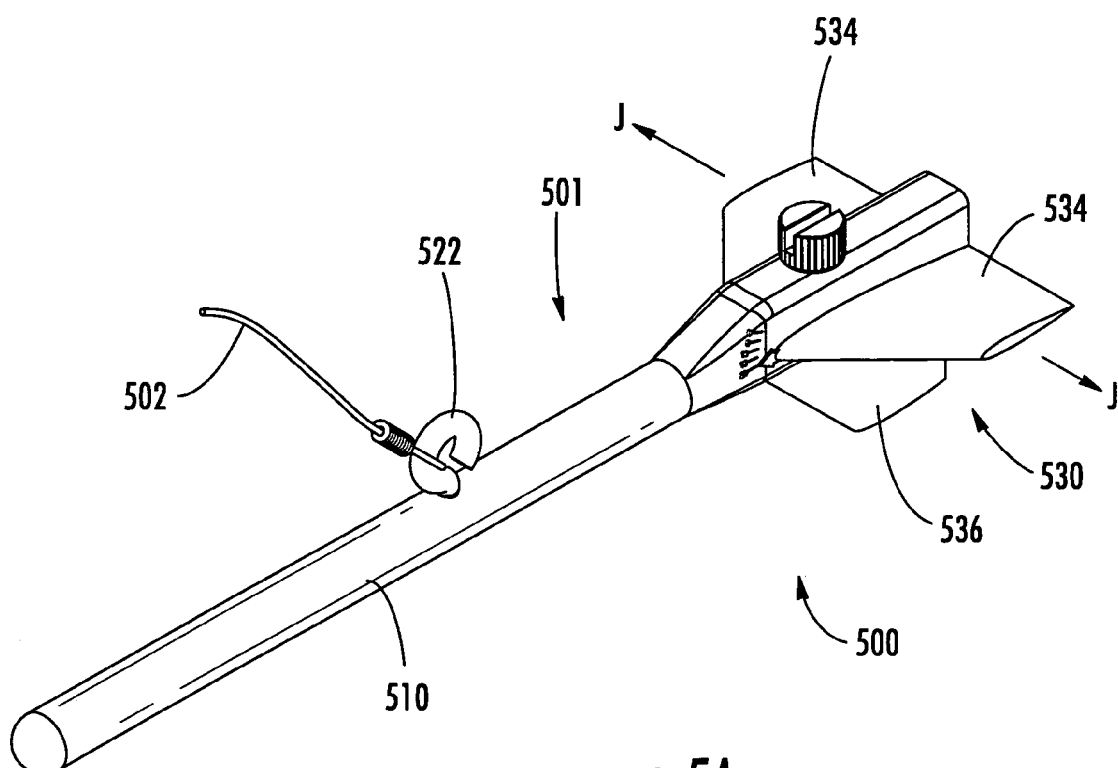
FIG. 5A is a perspective view of a wind gauge according to further embodiments of the present invention.
Figure 5B:
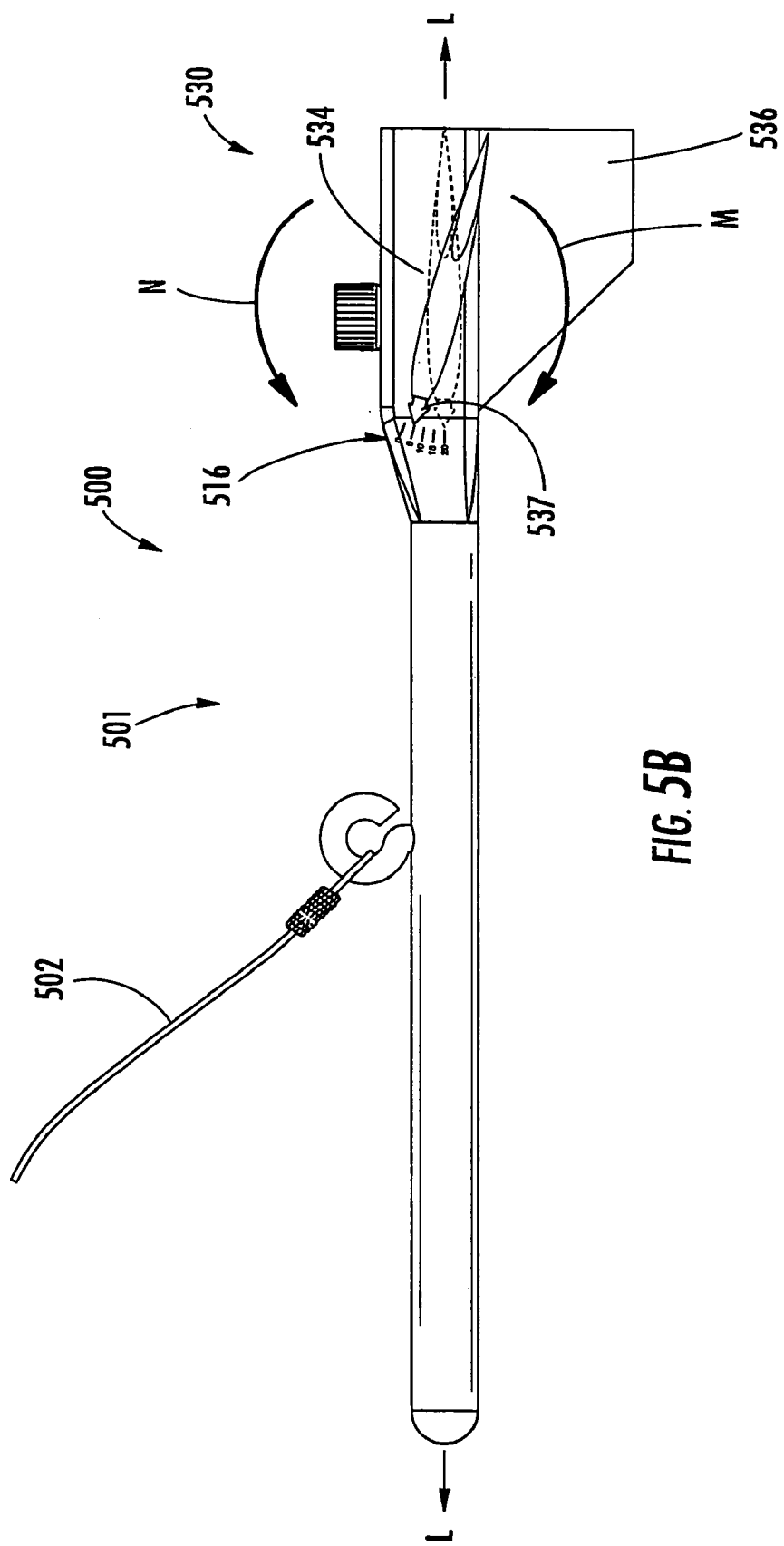
FIG. 5B is a side view of the wind gauge of FIG. 5A.

With reference to FIGS. 5A and 5B, a wind vane 500 according to further embodiments of the present invention is shown therein. The wind gauge 500 includes a wind vane 501 and a cord 502 coupled to a body 510 of the wind vane 501 via an eyelet 522 at an intermediate position along the length of the body 510. A wing assembly 530 is mounted on the body 510.

The wing assembly 530 includes lift wings 534 and a stabilizer fin 536. The lift wings 534 have a teardrop-shaped airfoil section. The wings 534 are mounted on the body 510 so as to be rotatable about an axis J-J that is horizontal and perpendicular to the axis L-L. For example, the wings 534 can be positioned in each of a first position as shown in solid lines in FIG. 5B and a second position as shown in dashed lines in FIG. 5B. According to some embodiments, the wings 534 are movable in tandem, for example, by a connecting shaft that passes through the body 510. A set-screw 528 may be provided to engage the connecting shaft or otherwise secure the wings 534 in a selected position.

In use, the user rotates the wings 534 in a clockwise M or counterclockwise N direction to set the prescribed wind speed. By doing so, the user sets the angle of attack of the wings 534 and thereby the amount of lift force that will be generated by a wind. In this manner, the adjustable angle wings serve as a lift control system. The wind vane 501 will attain the prescribed level position responsive to a wind having the prescribed speed corresponding to the wing setting. A pointer 537 is provided on the wings 534 and indicia 516 (e.g., "5", "10", "15", etc.) is provided on the body 510 to indicate the wind speed setting of the wind gauge 500.

Figure 6A:
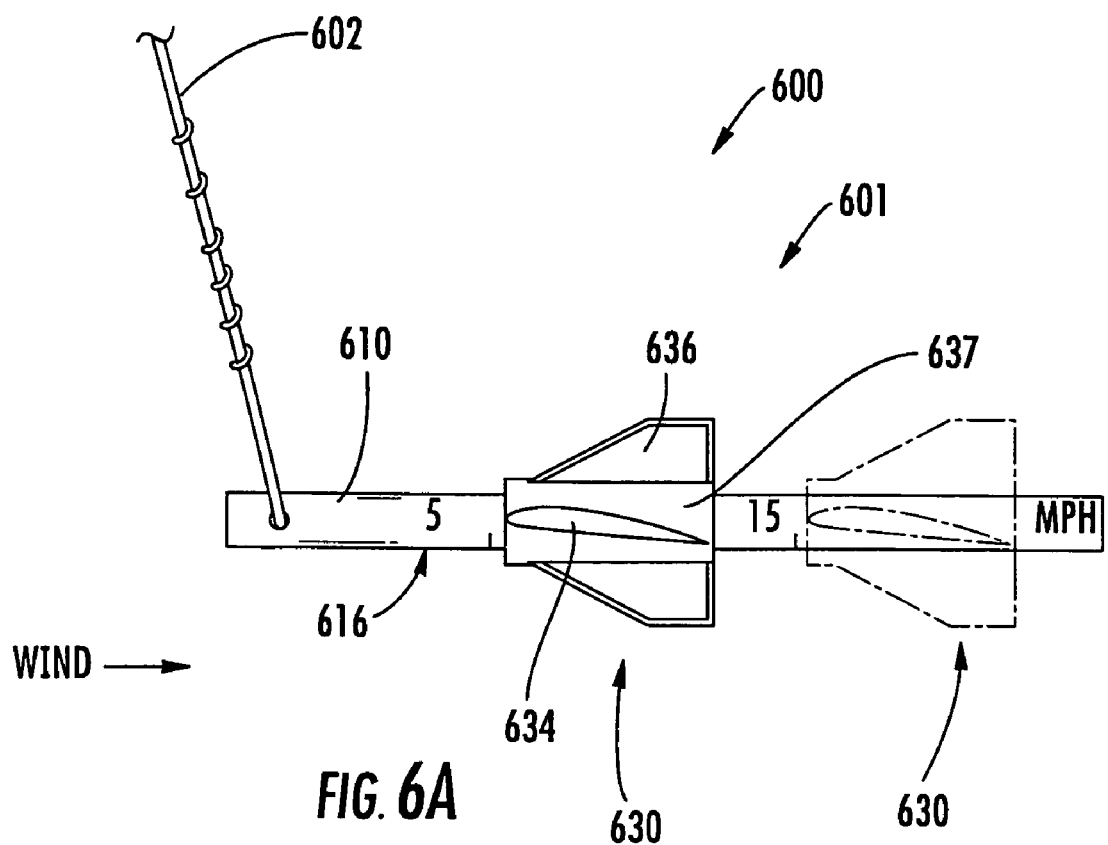
FIG. 6A is a side view of a wind gauge according to further embodiments of the present invention.
Figure 6B:
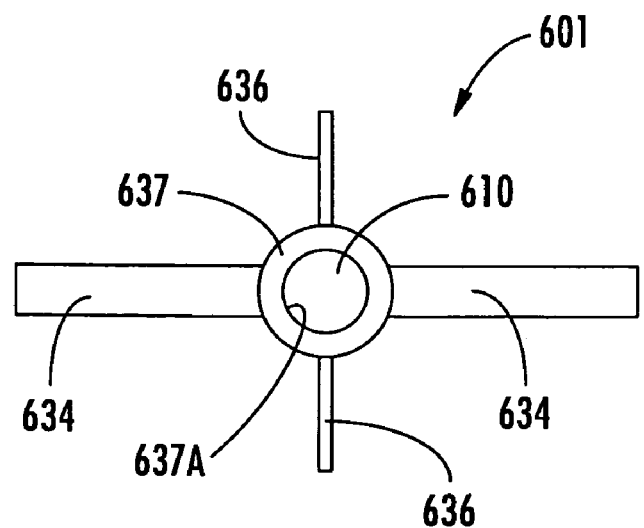
FIG. 6B is a rear end view of the wind gauge of FIG. 6A.

With reference to FIGS. 6A and 6B, a wind gauge 600 according to further embodiments of the present invention is shown therein. The wind gauge 600 includes a wind vane 601 and a cord 602. The wind vane 601 includes a body 610 and a wing assembly 630. The wing assembly 630 includes a carrier 637 defining a passage 637A (FIG. 6B) through which the body 610 extends. Opposed wings 634 and opposed stabilizer fins 636 extend outwardly from the carrier 637. Indicia 616 (e.g., "5", "10", "15 MPH") is provided along the length of the body 610.

The carrier 637 is slidable along the length of the body 610. The wing assembly 630 can be selectively positioned along the length of the body 610 and secured at the desired position by any suitable technique (e.g., one or more of the various mechanisms discussed above with regard to the weight member 142). For example, the wing assembly 630 can be selectively positioned at a first position as shown in solid lines in FIG. 6A and then slid by the user to a second position as shown in dashed lines in FIG. 6A, or vice-versa.

When deployed, the wind vane 601 will assume its level position as shown in FIG. 6A in response to a wind speed corresponding to the setting of the wing assembly 630. For example, when the wing assembly 630 is set at the first position (as shown in solid lines in FIG. 6A), the wind vane 601 will assume the level position responsive to a wind of having a first prescribed wind speed. When the wing assembly 630 is set at the second position (as shown in dashed lines), the wind vane 601 will assume the level position at a different, second prescribed wind speed. It will be appreciated that the positioning of the wing assembly 630 will determine the associated moment arm for both its mass and its lift force.

Figure 7A:
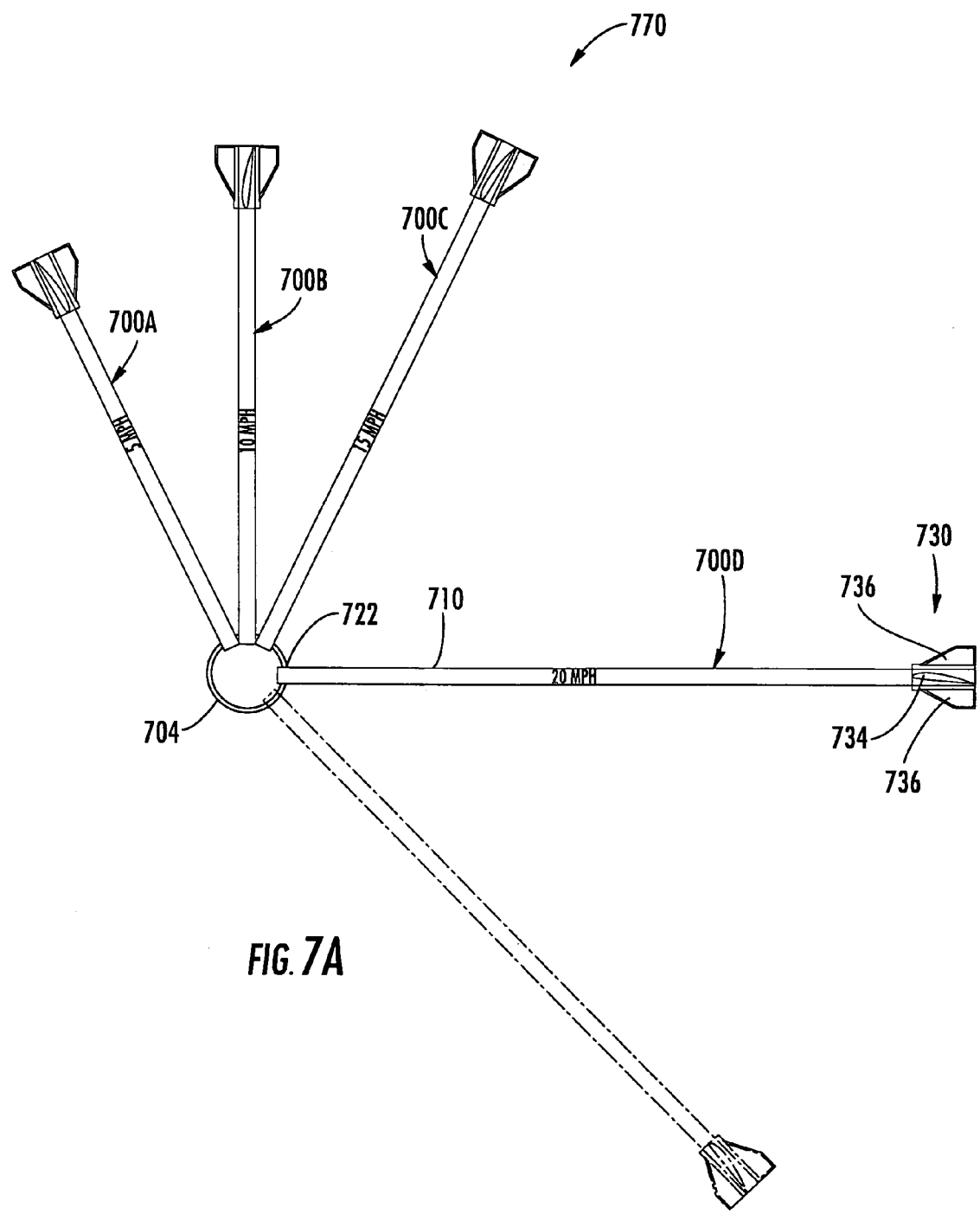
FIG. 7A is a side view of a wind gauge kit according to embodiments of the present invention.
Figure 7B:
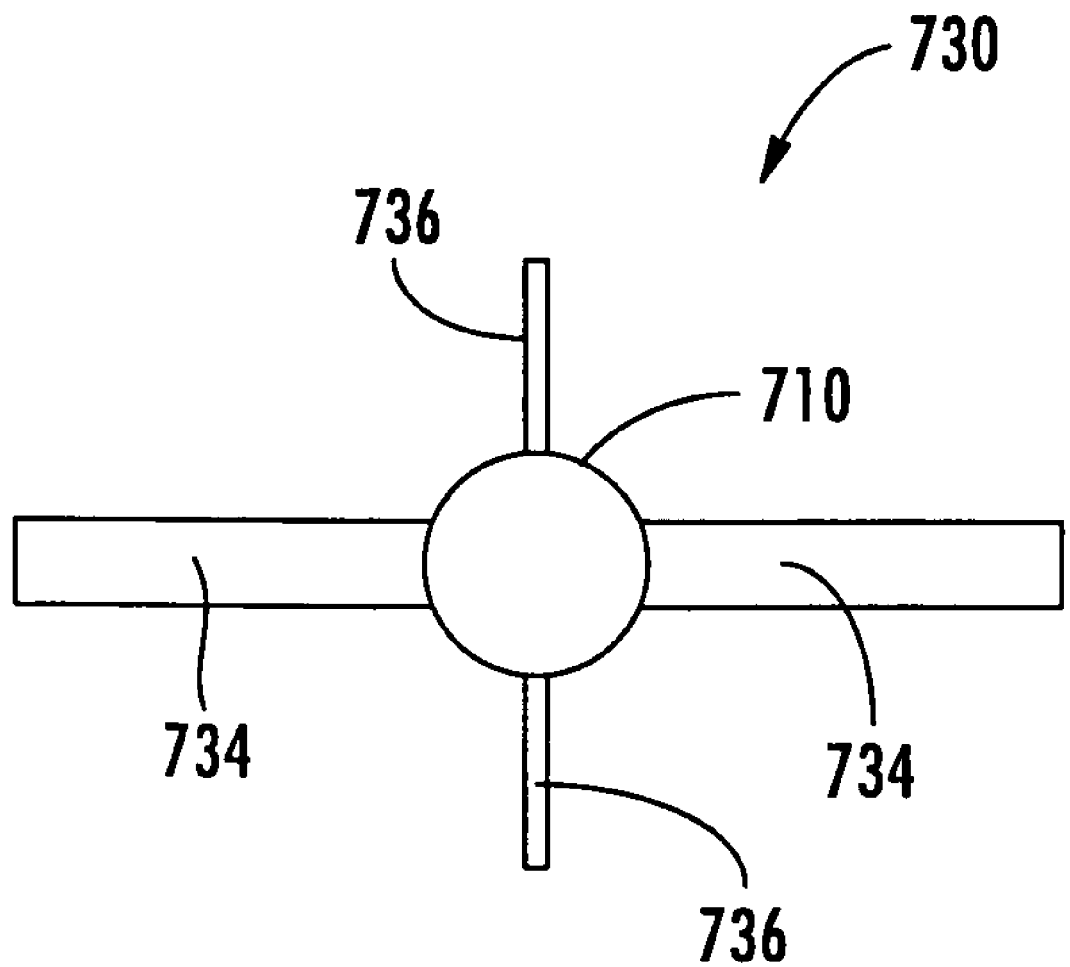
FIG. 7B is an end view of a wind gauge forming a part of the wind gauge kit of FIG. 7A.

With reference to FIGS. 7A and 7B, a wind gauge kit 770 according to further embodiments of the present invention is shown therein. The wind gauge kit 770 includes a holder ring 704 and a plurality of wind gauges 700A, 700B, 700C, and 700D loosely mounted on the ring 704. Each of the wind gauges 700A-D includes a body 710, a hole 722 through which the ring 704 is looped, and a wing assembly 730. The wing assembly 730 may include a pair of horizontally opposed lift wings 734 (which may be teardrop-shaped in airfoil section) and a pair of vertically opposed stabilizer fins 736 (which may be flat) as shown.

Each of the wind gauges 700A-D is configured to attain a level position responsive to a different prescribed wind speed. In the wind gauge kit 770, each wind gauge 700A-D has a different respective weight and length so that each requires a different wind speed to attain the level position. It will be appreciated that other mechanisms may be used to set the prescribed wind speed, such as providing different amounts of weight or differently positioning weights on each wind gauge 700A-D. In use, the user may sequentially deploy each of the wind gauges 700A-D until one assumes its level position responsive to the wind, thereby indicating to the user that the wind speed is the prescribed wind speed of the deployed wind gauge. For example, in FIG. 7A, the wind gauge 700A is shown transitioned to its level position (solid lines) from a non-level position (dashed lines) by a wind having the corresponding prescribed wind speed. Each of the wind gauges 700A-D may be provided with indicia 716 representing its prescribed wind speed.

Figure 8:
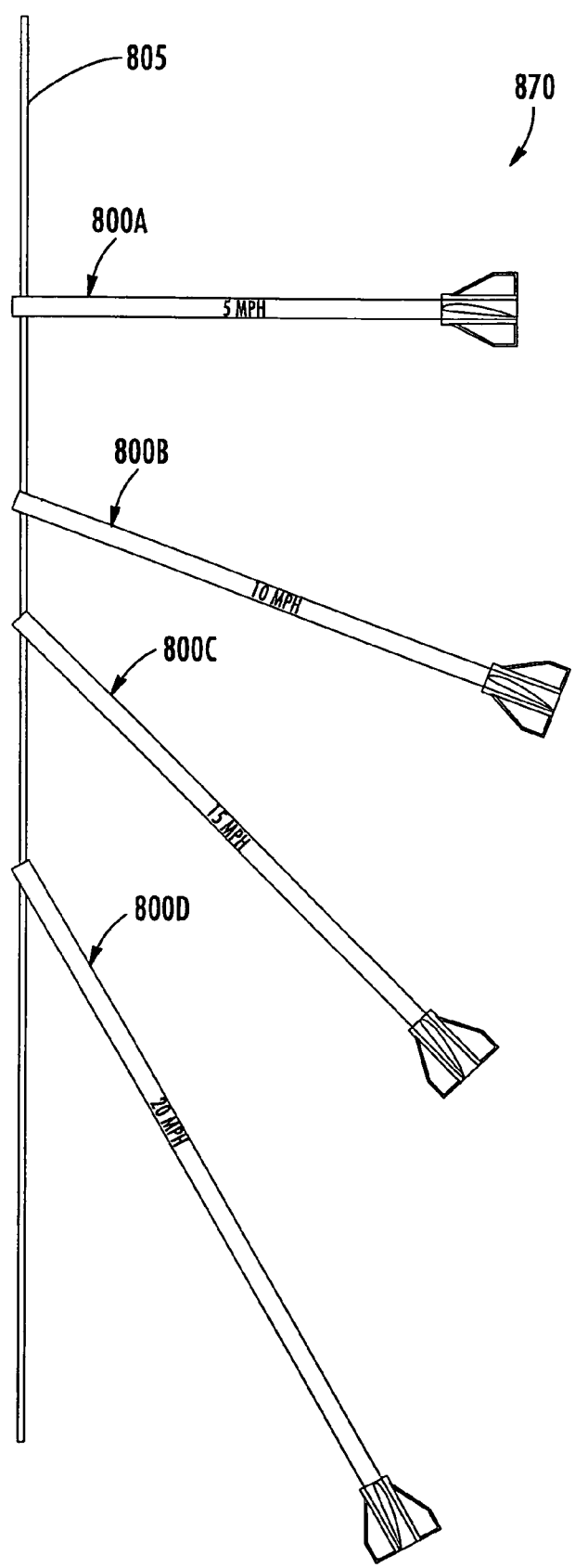
FIG. 8 is a side view of a wind gauge kit according to further embodiments of the present invention.

With reference to FIG. 8, a wind gauge kit 870 according to further embodiments of the present invention is shown therein. The wind gauge kit 870 may be constructed in the same manner as the wind gauge kit 770, except that the wind gauges 800A, 800B, 800C, 800D of the wind gauge kit 870 are mounted on a shared holder rod 805. In use, the rod 805 may be held, supported, or hung so that two or more of the wind gauges 800A-D are simultaneously deployed and spatially distributed. The user may readily measure the incident wind speed by identifying the wind gauge 800A-D that has the highest prescribed wind speed and is in its level position and determining its corresponding prescribed wind speed. For example, as shown in FIG. 8, the wind gauge 800A is indicative of the wind speed.

Wind gauges according to the present invention may be adapted for measuring winds of various ranges of wind speeds. According to some embodiments, the wind gauges are adapted to measure wind speeds in the range of from about 0 to 25 mph. According to some embodiments, the wind gauges are adapted to measure wind speeds in the range of from about 0 to 15 mph.

While certain embodiments have been described and illustrated above, it will be appreciated that various modifications may be made to these and other embodiments within the scope of the present invention. For example, different or additional indicia may be provided for indexing wing or weight member adjustments.

It will be appreciated that environmental parameters such as temperature, humidity and altitude may affect the lift force generated by a wind on a wind gauge as described herein. Thus, wind gauges according to the present invention may be configured to provide indication of a given prescribed wind speed under certain conditions and the indicia on the wind vane may reflect this wind speed. Under different conditions, the wind speed indicated on the wind gauge may be somewhat inaccurate. However, the wind gauge is nonetheless regarded as assuming the level position in response to a prescribed wind speed. The procedure for using the wind gauge may include determining and applying an adjustment to the indicated wind speed in the case of non-standard conditions.

According to some embodiments and as illustrated, wind gauges of the present invention may be configured such that the body thereof is generally horizontally oriented when the wind vane is in its level position. However, wind gauges may also be configured such that a portion of the body is not horizontally extending when the wind vane is in the level position.

The various adjustability features described above may be combined. For example, one or more of the wind gauges 700A-D may include a movable weight, a replaceable weight, a moveable wing, an angle adjustable wing, etc.

Techniques and features other than those described above may be used to secure the weight members and/or wings in selected positions. For example, the weight members may be internally threaded and the body externally threaded so that the weight position is adjusted by rotating the weight member relative to the body.

While front end mounted weight members 442, 449 are described above, removable weights may be attached in other ways. Additionally, one or more of the removable weights may be cumulative or additive. For example, the removable weights may be mountable on the body such that a first weight is mounted to correspond to a first prescribed wind speed and a second weight is mounted on the body in addition to the first weight to correspond to a second prescribed wind speed.

While the embodiments above show certain numbers of weights or wind gauges, it will be appreciated that any number of weights or wind gauges may be employed. For example, the wind gauge 400 of FIGS. 4A and 4B may include three or more weight members.

Removable and replaceable weights may also be used to adjust the center of gravity of the wind vane, either to increase or reduce the amount of lift force required to achieve a level position. Removable and replaceable weights may be selectively positionable along the length of the wind vane for use in a manner similar to the slider weight member 142.

The wind gauge kit 770 as described above may omit the holder ring 704. For example, a series of wind gauges 700A-D may be provided separately but as a group or kit. As a further alternative, each of the wind gauges 770 may have its own cord with each of the cords being joined to one another.

According to some embodiments, the wind vanes are decorative. For example, the wind vanes may simulate aircraft (e.g., an airplane, a space shuttle, etc.), birds or the like.

It is particularly contemplated that wind gauges and wind gauge kits according to the present invention may be formed so as to be portable and handheld. According to some embodiments, each of the wind gauges 100, 200, 300, 400, 500, 600 has a total volume of no more than 1 cubic inch and a greatest dimension of no more than 6 inches. According to some embodiments, each wind gauge has a total volume of no more than 0.5 cubic inch and a greatest dimension of no more than 4 inches.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which claimed is:

1. A wind gauge comprising:
    a wind vane including at least one wing, wherein the wind vane is adapted to assume a prescribed level position responsive to wind incident on the wind vane; and
    a weight system operable to selectively adjust a center of gravity of the wind vane, the weight system including a weight member positionable at first and second alternative locations on the wind vane, wherein:
        when the weight member is positioned at the first location, the wind vane will assume the prescribed level position responsive to a first prescribed wind speed incident on the wind vane; and when the weight member is positioned at the second location, the wind vane will assume the prescribed level position responsive to a second prescribed wind speed incident on the wind vane.

2. The wind gauge of claim 1 wherein the wind vane is pivotable about a pivot location responsive to a wind, and the first and second locations are located on a side of the pivot location opposite the at least one wing.

3. The wind gauge of claim 1 wherein the wind vane is pivotable about a pivot location responsive to a wind, and the first and second locations are located on the same side of the pivot location as the at least one wing.

4. The wind gauge of claim 1 wherein the weight member is slidable between the first and second positions.

5. The wind gauge of claim 1 wherein the at one least wing has a teardrop-shaped airfoil section.

6. The wind gauge of claim 1 wherein the wind gauge is adapted to be handheld in use.

7. The wind gauge of claim 1 including a support member coupled to the wind vane so as to allow free movement of the wind vane responsive to an incident wind to be measured.

8. The wind gauge of claim 7 wherein the support member includes a rigid or semi-rigid handle member.

9. The wind gauge of claim 7 wherein the support member includes a flexible cord.

10. The wind gauge of claim 7 wherein the support member is coupled to the wind vane at an intermediate location along a longitudinal axis of the wind vane.

11. The wind gauge of claim 7 wherein the support member is coupled to the wind vane at a front end thereof.

12. The wind gauge of claim 1 including a level orientation indicator adapted to indicate when the wind vane assumes the prescribed level position.

13. The wind gauge of claim 12 wherein the level orientation indicator includes a bubble level device.

14. A wind gauge comprising:
a wind vane including at least one wing, wherein the wind vane is adapted to assume a prescribed level position responsive to wind incident on the wind vane; and
first and second weight members that are removably mountable on the wind vane, wherein:
when the first weight member is mounted on the wind vane, the wind vane will assume the prescribed level position responsive to a first prescribed wind speed incident on the wind vane; and
when the second weight member is mounted on the wind vane, the wind vane will assume the prescribed level position responsive to a second prescribed wind speed incident on the wind vane.

15. The wind gauge of claim 14 wherein the at one least wing has a teardrop-shaped airfoil section.

16. The wind gauge of claim 14 wherein the wind gauge is adapted to be handheld in use.

17. The wind gauge of claim 14 including a level orientation indicator adapted to indicate when the wind vane assumes the prescribed level position, wherein the level orientation indicator includes a bubble level device.

18. A wind gauge comprising:
a wind vane including at least one wing;
wherein the wind vane is adapted to assume a prescribed level position responsive to wind incident on the wind vane; and
wherein the wind vane includes a body, the at least one wing is mounted on the body, and an angle of the at least one wing relative to the body is adjustable between a first angular position and a second angular position, wherein:
when the at least one wing is disposed in the first angular position, the wind vane will assume the prescribed level position responsive to a first prescribed wind speed incident on the wind vane; and
when the at least one wing is disposed in the second angular position, the wind vane will assume the prescribed level position responsive to a second prescribed wind speed incident on the wind vane.

19. The wind gauge of claim 18 wherein the at one least wing has a teardrop-shaped airfoil section.

20. The wind gauge of claim 18 wherein the wind gauge is adapted to be handheld in use.

21. The wind gauge of claim 18 including a level orientation indicator adapted to indicate when the wind vane assumes the prescribed level position, wherein the level orientation indicator includes a bubble level device.

22. A wind gauge comprising:
a wind vane including at least one wing;
wherein the wind vane is adapted to assume a prescribed level position responsive to wind incident on the wind vane; and
wherein the wind vane includes a body and the at least one wing is selectively positionable on the body at first and second alternative locations, wherein:
when the at least one wing is positioned on the body at the first location, the wind vane will assume the prescribed level position responsive to a first prescribed wind speed incident on the wind vane; and
when the at least one wing is positioned on the body at the second location, the wind vane will assume the prescribed level position responsive to a second prescribed wind speed incident on the wind vane.

23. The wind gauge of claim 22 wherein the at one least wing has a teardrop-shaped airfoil section.

24. The wind gauge of claim 22 wherein the wind gauge is adapted to be handheld in use.

25. The wind gauge of claim 22 including a level orientation indicator adapted to indicate when the wind vane assumes the prescribed level position, wherein the level orientation indicator includes a bubble level device.

26. A wind gauge kit comprising:
a connecting member;
a first wind gauge mounted on the connecting member, the first wind gauge including a first wind vane including at least one first wing, the first wind vane being adapted to assume a first prescribed level position responsive to a first prescribed wind speed incident on the first wind vane; and
a second wind gauge mounted on the connecting member, the second wind gauge including a second wind vane including at least one second wing, the second wind vane being adapted to assume a second prescribed level position responsive to a second prescribed wind speed incident on the second wind vane, wherein the second prescribed wind speed is greater than the first prescribed wind speed.

27. The wind gauge kit of claim 26 wherein the connecting member is configured to allow the first and second wind gauges to be simultaneously deployed such that each of the first and second wind gauges independently and simultaneously responds to an incident wind.

28. The wind gauge kit of claim 27 wherein the connecting member includes a ring on which the first and second wind gauges are mounted.

29. The wind gauge kit of claim 27 wherein the connecting member includes a rod on which the first and second wind gauges are mounted.

30. The wind gauge kit of claim 29 wherein the first and second wind gauges are spatially distributed along the rod.

* * * * *

UNITED STATES PATENT AND TRADEMARK OFFICE
CERTIFICATE OF CORRECTION

PATENT NO.        : 7,269,998 B2                                              Page 1 of 1
APPLICATION NO.   : 11/200604
DATED             : September 18, 2007
INVENTOR(S)       : Hutson et al.

It is certified that error appears in the above-identified patent and that said Letters Patent is hereby corrected as shown below:

Column 11, Claim 5, Line 15: Please correct "at one least"
                             To read -- at least one --

Column 11, Claim 15, Line 52: Please correct "at one least"
                              To read -- at least one --

Column 12, Claim 19, Line 13: Please correct "at one least"
                              To read -- at least one --

Column 12, Claim 23, Line 40: Please correct "at one least"
                              To read -- at least one --

Signed and Sealed this

Eighteenth Day of December, 2007

JON W. DUDAS
*Director of the United States Patent and Trademark Office*